United States Patent [19]

Nishida

[11] 4,194,355
[45] Mar. 25, 1980

[54] CONNECTION STRUCTURE FOR WATCH CASE AND BAND

[75] Inventor: Mitsuo Nishida, Tokyo, Japan

[73] Assignee: Citizen Watch Co., Ltd., Tokyo, Japan

[21] Appl. No.: 879,583

[22] Filed: Feb. 21, 1978

[30] Foreign Application Priority Data

Feb. 26, 1977 [JP] Japan ............................ 52-21958[U]

[51] Int. Cl.² ............................................. G04B 37/12
[52] U.S. Cl. ..................................... 368/282; 368/291; 368/204
[58] Field of Search ............... 58/23 R, 23 A, 23 BA, 58/53, 57.5, 88 R, 89, 152 R; 63/21; 339/17 M, 59 M

[56] References Cited

U.S. PATENT DOCUMENTS

| | | | |
|---|---|---|---|
| 3,681,587 | 8/1972 | Brien | 58/50 R |
| 3,729,923 | 5/1973 | Brigliano | 58/50 R |
| 3,788,059 | 1/1974 | Spadini | 58/23 BA |
| 3,795,884 | 3/1974 | Kotaka | 339/59 M |
| 3,971,207 | 7/1976 | Murakami | 58/23 BA |
| 3,973,706 | 8/1976 | Boyce | 58/23 BA |
| 4,008,300 | 2/1977 | Ponn | 339/17 M |
| 4,082,398 | 4/1978 | Bourdon | 339/59 M |

Primary Examiner—J. V. Truhe
Assistant Examiner—William L. Feeney
Attorney, Agent, or Firm—Sherman & Shalloway

[57] ABSTRACT

A connection structure for a watch casing and a watch band comprises internal modules incorporated in the watch casing and external modules secured to the watch band which are electrically and positively connected through a relay connector having electronic conductors at the position where the watch band is fixed to the casing.

5 Claims, 6 Drawing Figures

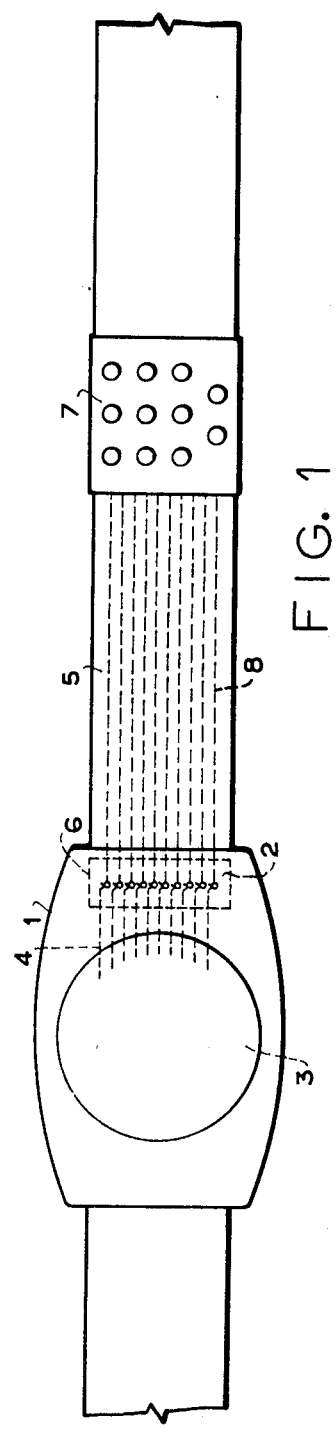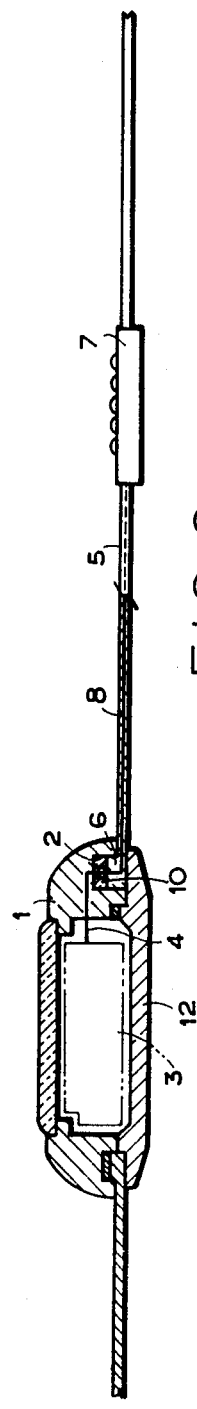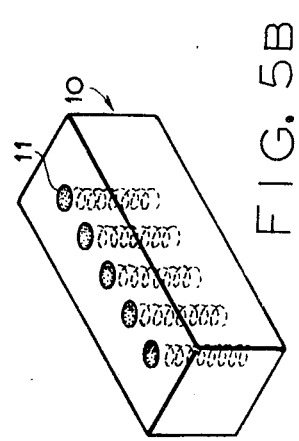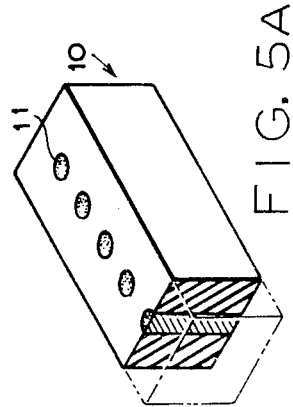

CONNECTION STRUCTURE FOR WATCH CASE AND BAND

This invention relates to a connection structure for a watch casing and a watch band, in which internal modules incorporated in the watch casing and external modules secured to the watch band are electrically and positively connected through a relay connector having electric conductors at the position where a watch band is fixed to the casing.

In an electronic wristwatch, it is very advantageous from the standpoints of the design and manufacture of an electronic wristwatch having multi-functions and various applications that modules such as a battery which may not be provided inside the watch casing, IC circuit operation button and the like, are arranged on the watch band. However, it is very difficult to electrically connect the internal modules incorporated in the watch casing and the external modules dispersedly arranged on the watch band. This is a disadvantage since the accuracy of the wristwatch is made extremely low due to mal-connection therebetween. An object of the present invention is to obviate such a defect and to provide an electronic wristwatch having highly reliable functions.

According to one aspect of this invention, there is provided a connection structure for a watch casing and a watch band comprising a case for the watch casing, an internal module incorporated into the inside of said case, a recess formed at the bottom of the case, a plurality of lead pins disposed at the top of the recess and each being connected to the internal module respectively, a relay connector block of an elastic insulating material being vertically provided with a plurality of flexible conductors and received in the recess so as to contact with the lead pins, said watch band of a flexible insulating material provided at the proximal end of the watch band with a projection engaging the recess, an external module attached to a given portion of the watch band, a plurality of lead wires embedded in the watch band, each end of the wires being connected to each terminal provided so as to contact with the flexible conductor and the other end being connected to the external module, and a back cover firmly sandwiching the case and projection.

An embodiment of the present invention will now be described referring to the accompanying drawings wherein:

FIG. 1 is an outline drawing showing an embodiment of the present invention;

FIG. 2 is a sectional view thereof;

FIG. 5 is an explanatory drawing showing relay connectors according to the present invention.

Figure 3:
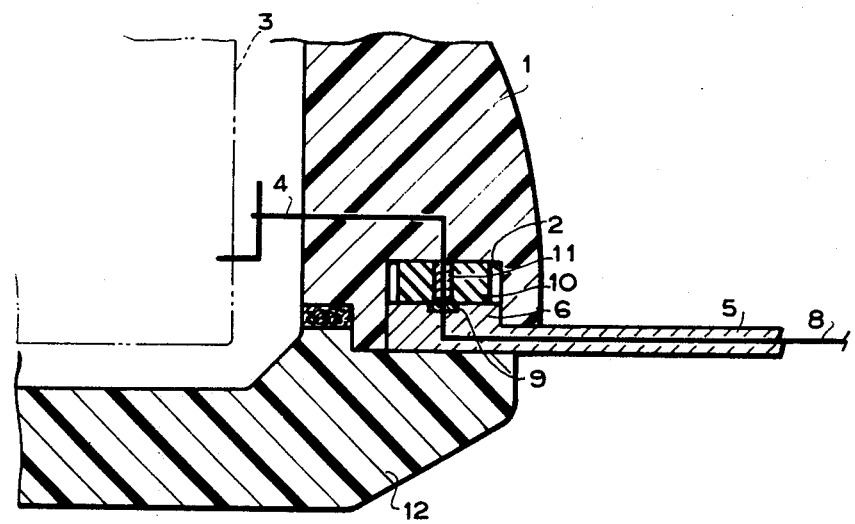
FIG. 3 and FIG. 4 are explanatory drawings for showing the principal parts of the invention.

In the drawings, reference numeral 1 designates a case of a watch casing and reference character 2 designates recesses symmetrically formed on the bottom surface of said case, on the top surfaces of which a plural number of lead pins 4 are respectively provided in a row so as to be connected to internal modules 3 incorporated in the watch casing. Reference numeral 5 denotes a watch band made of flexible insulating material and having, at its proximal end, projections 6 to be inserted into the respective recesses 2 of said case 1. This band is provided with external modules 7 such as a battery, IC cicuit elements, a buzzer, an operation push button and the like. This band is further provided with a plural number of lead wires 8 embedded therein, respective one ends of which are connected to the external modules 7 and the respective other ends of which to the terminals 9 provided in a row on the projections 6 formed on the proximal end of the band. Reference numeral 10 is a relay connector made of an elastic insulating material, in which a plural number of flexible conductors 11 made of conductive rubber are embedded with both ends exposed therefrom, as shown in FIG. 5(A), at positions corresponding to the lead pins 4 provided in a row to the recess portion 2 of the case 1 and the terminals 9 provided in a row on the projections 6 of the band 5. Alternatively, said relay connector 10 may be formed with a plural number of spring-shaped flexible conductors 11 having electrodes at their both ends and arranged vertically as shown in FIG. 5(B). Thus, the watch band 5 and the case 1 of the watch casing are connected in such a manner that the relay connectors 11 and the projections 6 on the proximal end of the band 5 are inserted in layers into the recesses 2 of the case 1; a plural number of lead pins 4 exposed from the top surfaces of the recesses 2 and a plural number of terminals 9 provided in a row on the respective projections 6 of the band 5 are electrically connected through the conductors 11 of the relay connector 10; and under such a condition where the external modules 7 incorporated in the watch band and the internal modules 3 incorporated in the case are electrically connected, a back cover 12 is securely fixed to the case 1 so as to watertightly make compression joint of the projections 6 of the band which are inserted into the recess portions 2 and the relay connector 10 made of an elastic material.

Figure 4:
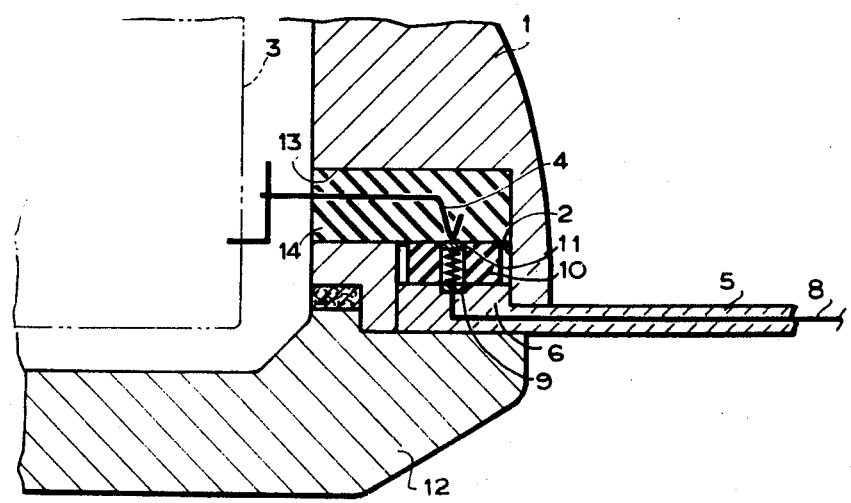

While the embodiment shown in FIG. 3 comprises the watch casing made of plastic material, when the casing is made of metal material, the case 1 is provided with a hole 13 for inserting therein an insulator 14 in which a plural number of lead pins 4 are embedded, as shown in FIG. 4.

The present invention having the structure as explained above, can offer various advantages and practical effects such that, with adoption of the relay connector 10, when the back cover 12 is secured to the case 1, the pressure is applied to the joint portions of the elastic conductors 11 vertically provided in the relay connector 10, the corresponding lead pins 4 and the terminals 9 provided on the band end, thereby reducing electrically connecting resistance and positively carrying out the electric connection between the internal modules 3 incorporated in the watch casing and the external modules 7 dispersedly arranged on the watch band as well as attaining an excellent waterproof effect. Moreover it is possible to design and manufacture of a wristwatch which is thin in thickness and has multifunctions since the modules such as a battery, IC electronic circuit elements, an operating button and the like are dispersedly provided on a watch band. Furthermore, by the replacement of the watch band having the external modules thereon, the specification of the watch can be easily changed.

What is claimed is:

1. A connection structure between a watch casing and a watchband comprising:
   (a) a body for said watch casing,
   (b) at least one internal module incorporated within said body,
   (c) a recess formed at the bottom surface of said body, (d) a pluralilty of electrical connector pins each having one end exposed at an upper portion of said recess and each being connected to at least one of said internal modules,
(e) a connector block of an elastic insulating material disposed in said recess and provided with a plurality of resilient conductors extending between an upper and lower surface thereof, said resilient conductors electrically connected to said electrical connector pins at the upper surface of the connector block,
(f) a flexible insulating material provided at the proximal end of said watchband with a projection received in said recess,
(g) at least one external module attached to said watchband,
(h) a plurality of connector wires embedded in said watch band, each end of said wires being connected to an individual terminal in contact with one of said resilient conductors at the lower surface of the connector block, the other end of said wires connected to at least one of said external modules, and
(i) a back cover compressing said projection and said connector block against the casing body.

2. The connection structure according to claim 1 wherein said resilient conductors are embedded in said connector block with both ends of said conductors protruding from the opposite surfaces of said connector block.

3. The connection structure according to claim 1 wherein each said resilient conductors is a spring.

4. The connection structure according to claim 1 wherein said casing is made of plastics.

5. The connection structure according to claim 1 wherein said casing is made of metal and the casing body is formed with a hole receiving an insulating member, said connector pins embedded in the insulating member.

* * * * *